July 5, 1960         M. L. ARNOLD         2,943,641
DEVICE FOR ATTENUATING PULSATIVE FLOW IN GASES
Filed Jan. 30, 1956                    7 Sheets-Sheet 1

INVENTOR
MARION L. ARNOLD.

BY *Adams, Forward & McLean*

ATTORNEYS

July 5, 1960  M. L. ARNOLD  2,943,641
DEVICE FOR ATTENUATING PULSATIVE FLOW IN GASES
Filed Jan. 30, 1956  7 Sheets-Sheet 2

INVENTOR
MARION L. ARNOLD.

BY Adams, Forward & McLean
ATTORNEYS

July 5, 1960  M. L. ARNOLD  2,943,641
DEVICE FOR ATTENUATING PULSATIVE FLOW IN GASES
Filed Jan. 30, 1956  7 Sheets-Sheet 3

INVENTOR
MARION L. ARNOLD.

United States Patent Office 2,943,641
Patented July 5, 1960

2,943,641

DEVICE FOR ATTENUATING PULSATIVE FLOW IN GASES

Marion L. Arnold, Downey, Calif., assignor to Richfield Oil Corporation, Los Angeles, Calif., a corporation of Delaware Filed Jan. 30, 1956, Ser. No. 562,155

22 Claims. (Cl. 138—26)

This invention relates to the attenuation of pressure and current variations in flowing compressible fluids and in particular relates to the elimination of periodic variations of pressure and flow rate in gas lines introduced by the use of displacement type compressors.

In industry considerable trouble has been experienced with the piping attached to displacement type compressors because of the periodic nature of the flow of gases to and from such equipment. The term "displacement type compressors" is used in its broad sense and includes not only reciprocating compressors employing a piston, plunger or similar device but also such compressors as are commonly known as rotary compressors in which the displacement is effected by the meshing of gear teeth, the action of an eccentrically supported rotor, or the like.

The gas flow from displacement type compressors, as is well-known, is periodic in nature exhibiting periodic variations from a mean rate of flow. The kinetic energy of the gas particles is therefore variable and results in a variable force acting upon such portions of the piping system confining the gas as may be capable of changing the momentum of the gas particles. If the piping is not rigidly supported where it is so acted upon dangerous and even destructive movement of the piping can occur. The periodic nature of gas flow from a displacement type compressor also initiates pressure waves which flow in the gas at the velocity of sound. Such pressure waves are readily reflected by bends and changes in diameter of the tubing and by equipment connected in the pipe line. A disturbing phenomenon known as "resonance" occurs if the reflecting portion of the piping has the proper length and configuration for the particular rate (frequency) of the periodic vibration.

An important object of this invention therefore is to reduce periodic pressure and flow disturbances noted above to an acceptable minimum by means of a volume current attenuating device. Another important object of this invention is to accomplish such attenuation with minimum loss of mean pressure in the gas line and with minimum attenuation of the gas flow in a positive direction to or from the compressor.

Yet a further object of this invention is to provide suitable apparatus for connection in gas lines which will substantially eliminate periodic variations in pressure and flow of the gas induced by displacement type compressors to which the gas line may be attached.

Volume current attenuation devices have been heretofore proposed and utilized to dampen periodic variations in gas flow. These devices are fundamentally characterized by the Stephens Patent No. 2,405,100, issued July 30, 1946, and essentially include a pair of relatively large pulsation absorbing chambers (acoustical capacitances) connected in series in a gas line attached to a displacement type compressor and interconnected by a restricted passage (acoustical inductance). In the Stephens patent and in the literature and patents subsequently describing such volume current attenuation devices, the dimensions of the pair of chambers and of the passage are calculated by a particular formula intended to give the chambers and interconnecting passage the characteristics of an acoustical low pass filter.

I have found, however, that such prior devices when operated under prescribed design conditions to produce an acoustical low pass filter having a cut-off frequency equal to the fundamental frequency to be suppressed permit substantial transmission, i.e. about 17%, of the fundamental frequency of the displacement type compressor, and therefore ineffective dampening is obtained by the use of such devices. When such devices are operated under prescribed design conditions in which cut-off frequency is selected at a value considerably less than the fundamental frequency, for example at 85% of fundamental frequency, there is nevertheless substantial transmission, i.e. about 11%, of the fundamental frequency through the volume current attenuation device.

This invention provides volume current attenuation devices which are capable of any desired attenuation of the fundamental frequency to be suppressed. The devices of this invention not only include the $\pi$-section of a pair of chambers (acoustical capacitances) interconnected by a restricted passage (acoustical inductance) but also volume current attenuation devices which fundamentally comprise a T-section of a pair of restricted passages interconnected by a chamber of relatively large dimensions as compared with the size of the restricted passages.

This invention also provides volume current attenuation devices including a series of $\pi$-sections, a series of T-sections, or a series of both $\pi$- and T-sections. This invention further provides volume current attenuation devices including end L-sections.

While the volume current attenuator sections described above relate to a single unit or series of units designed primarily to serve a single source of pulsative flow, it is frequently possible and is within the intent of this invention to adapt portions of complex plant piping as acoustical inductances and capacitances required for attenuation according to such techniques.

The apparatus provided by the present invention differs fundamentally from the prior devices for volume current attenuation, such as those provided by the Stephens patent, not only because different structures are contemplated by the present invention, but also because this invention requires a different structural relationship between the elements of such devices. The present invention moreover permits a substantially greater order of attenuation of different character than is obtainable by employing devices heretofore available.

Figure 1:
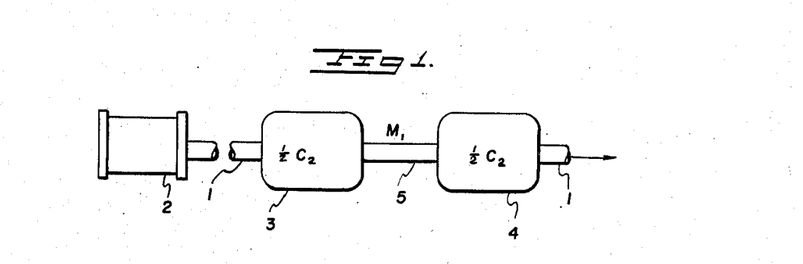
Figure 1 is a diagrammatic representation of a $\pi$-section attenuator used in accordance with this invention.

Figure 1 represents a fundamental π-section attenuator designed for insertion in a gas line 1 which is suitably connected to the output of displacement type gas compressor 2. The gas line ultimately delivers the compressed gas to a cooling tower or other apparatus (not shown). Inserted in gas line 1 are a pair of chambers 3 and 4 which are interconnected by passage 5.

Figure 2:
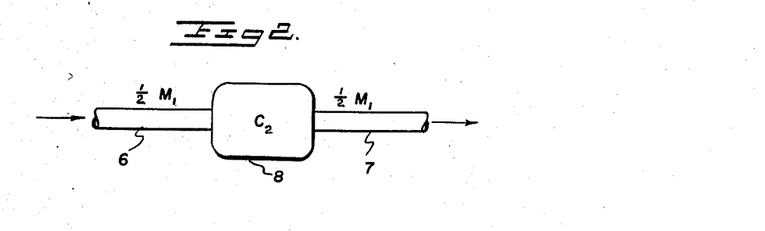
Figure 2 is a diagrammatic representation of a T-section attenuator used in accordance with this invention.

Figure 2 represents a fundamental T-section attenuator which may be inserted in gas line 1 in place of the π-section attenuator of Figure 1. The T-section attenuator of Figure 2 comprises a pair of passages 6 and 7 interconnected by chamber 8.

The value M of acoustic inductance of a passage is determined by the fixed dimensions of the passage and the density of the fluid in accordance with the following equation:

(1) $$M = \frac{m}{A^2}$$

where $m$ = mass of fluid in the passage in pounds,
$A$ = the cross-sectional area of the passage in square feet.

For tubes of circular cross-section Equation 1 reduces to (2) $$M = \frac{dl}{A}$$

where $d$ = density of the fluid in slugs per cubic foot at the average pressure and temperature,
$l$ = length of the tube in feet.

For short tubes an end correction in the form of added tube length is usually desirable. This is described in standard acoustical tests and for most installations may be ignored.

The passage may also take the form of an orifice or of a narrow slit in which case Equation 1 reduces to (3) $$M = \frac{6dw}{5A}$$

where $w$ = the length of the slit or orifice in feet in the direction of flow.

The value C of acoustical capacitance for a chamber, like the inductance of a passage, also depends upon the fixed dimensions of the chamber and the physical properties of the fluid. The value C may be determined for any chamber according to the following equation:

(4) $$C = \frac{V}{nP}$$

where $V$ = volume of the chamber in cubic feet,
$n$ = exponent of adiabatic or polytropic compression of the gas at average pressure and temperature,
$P$ = average pressure in pounds per square foot absolute.

It will be noted from the above definitions that a passage while containing substantial inductance also possesses a certain amount of capacitance and similarly a chamber possessing considerable capacitance also possesses a small amount of inductance. These are usually not significant in low pass acoustical wave filters employed in accordance with the principles of this invention. If, however, the fundamental frequencies to be attenuated are relatively high, the inductance possessed by a chamber and the capacitance possessed by a passage may become significant, in which case for purposes of the following equations the inductance of the chambers may be lumped with the inductance of the passages and the capacitance of the passages may be lumped with the capacitance of the chambers.

In the diagrammatic views shown in Figures 1 and 2, it will be noted that chambers 3, 4, and 8 all possess acoustical capacitance while passages 5, 6, and 7 all possess acoustical inductance.

If either the π-section of Figure 1 or the T-section of Figure 2 is inserted in the discharge line of a reciprocating or rotary compressor, as indicated in Figure 1, the section exhibits a peculiar property. While the compressor is run at relatively low speeds, the magnitudes of the periodically variable current or pressure entering and leaving the device, if measured at the same instance, will be found to be almost identical, that is, no attenuation occurs. However, as the speed of the compressor is slowly increased and measurements are continued, it is found that at a certain compressor speed the magnitudes of the periodic current and pressure leaving the device become less than the magnitudes of the periodic current and pressure entering the device. At higher compressor speeds the attenuation of the periodic current and pressure waves increases as a function of the frequency of the wave.

It will be noted that reference is made in the foregoing to both current and pressure waves. "Current wave" is intended to refer to the periodic variation in flow rate introduced by the periodic discharge of gas from compressor 2, and "pressure wave" is intended to refer to the periodic variation in gas pressure caused by the periodic discharge of gas from compressor 2. The frequency of these waves is of course established by the compressor speed and the number of discharges per revolution of the compressor. The pressure and current waves produced by the discharge of gas from compressor 2 thus have a fundamental frequency equal to the rate of puffs of gas discharged from the compressor. Harmonics also occur; these are multiples of the fundamental so their attenuation in a low pass attenuator is greater than the attenuation of the fundamental frequency.

Figure 18:
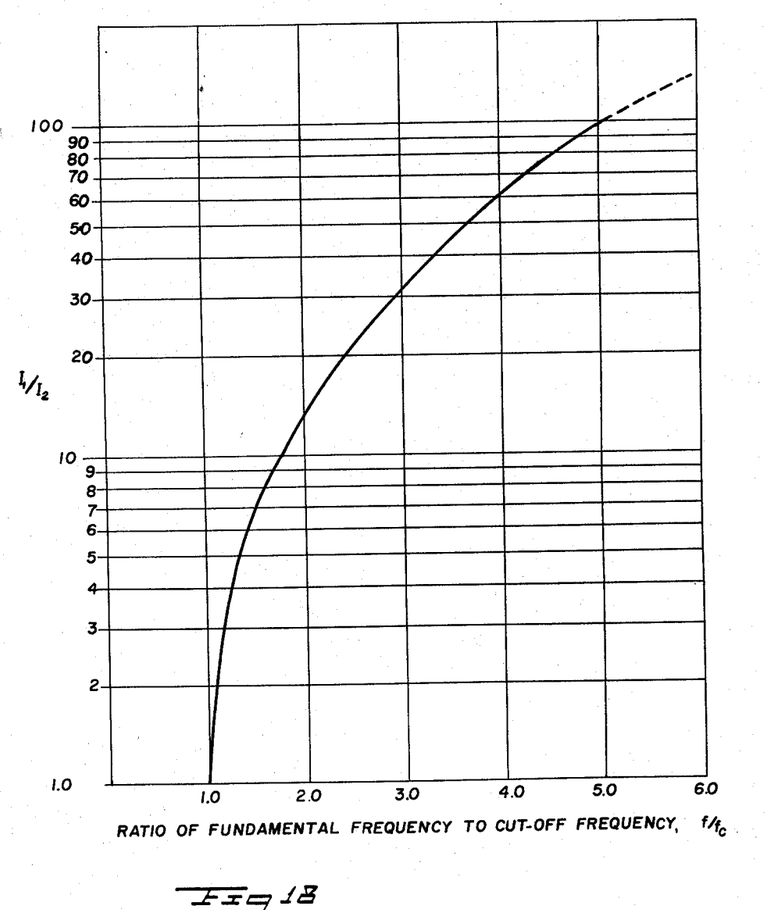
Figure 18 is a semi-log plot illustrating the theoretical performance of a single section of a low pass acoustical filter according to this invention showing attenuation (expressed in a log scale of the ratio $I_1:I_2$) against the ratio of fundamental frequency to cut-off frequency.

Figure 18 illustrates the theoretical performance of a single section low pass acoustical filter such as is diagrammatically represented in Figure 1 or 2. In Figure 18 it will be noted that the attenuation of such a simple section is a continuous function of frequency which commences at a cut-off frequency $f_c$. Cut-off frequency is defined for any simple π- or T-section according to the following equation:

(5) $$f_o = \frac{1}{\pi\sqrt{M_1 C_2}}$$

where $M_1$ = total inductance of the section,
$C_2$ = total capacitance of the section.

Thus in a balanced T-section, as shown in Figure 2, the cut-off frequency is determined by the inductance of passage 6, which is equal to one-half $M_1$, the inductance of passage 7, which is equal to one-half $M_1$, and the capacitance of chamber 8, which is equal to $C_2$, and, in the case of the balance π-section attenuator of Figure 1, by the capacitance of chamber 3, which is equal to one-half $C_2$, the capacitance of chamber 4, which is equal to one-half $C_2$, and the inductance of passage 5, which is equal to $M_1$.

Attenuation $a$ in such a device is expressed in Nepers defined by the following equation:

(6) $$a = \frac{1}{2}\ln\left(\frac{I_1}{I_2}\right)^2$$

where $I_1$ = the input current to the device,
$I_2$ = the output current from the device.

The ratio of input current to output current $$\frac{I_1}{I_2}$$

varies with frequency in accordance with the following equation:

(7) $$\frac{I_1}{I_2} = \frac{\sqrt{1+\frac{Z_1}{4Z_2}} + \sqrt{\frac{Z_1}{4Z_2}}}{\sqrt{1+\frac{Z_1}{4Z_2}} - \sqrt{\frac{Z_1}{4Z_2}}}$$

(7a) where $Z_1 = R_1 + j2\pi f M_1$ (7b) where $Z_2 = R_2 - j\frac{1}{2\pi f C_2}$ $f$ = frequency of the pressure or current wave in cycles per second,
$j$ = an operator producing a counterclockwise rotation of 90° ($\sqrt{-1}$),
$R_1$ and $R_2$ are the resistances of the passages and chambers, respectively, expressed in (lb.)(sec.)/(ft.)$^5$ units.

Generally $R_1$ and $R_2$ may be neglected. Attenuation in Nepers $a$ may also be expressed in terms of phase angle between the current and pressure waves according to the following equation:

(8) $$a + jB = 2\ln\left(\sqrt{1+\frac{Z_1}{4Z_2}} + \sqrt{\frac{Z_1}{4Z_2}}\right)$$

where B is the phase angle between flow rate and pressure of the periodically varying wave.

It will be seen that any desired finite attenuation $a$ desired for a given frequency may be selected. By Equations 6, 7, and 8 the ratio $Z_1/4Z_2$ may be found. From this value, the requisite product $M_1 C_2$ is then found by Equations 7a and 7b and the dimensions of a suitable attenuator to achieve such desired attenuation can then be determined. If a T-section is to be employed, the value $M_1$ is of course divided by two and the fixed dimensions of each passage 6 and 7 are determined by Equations 1, 2, or 3, while the dimensions of chamber 8 are determined directly from $C_2$ in accordance with Equation 4. Similarly, if a π-section attenuator is to be employed, the value of $C_2$ is divided by two and the physical dimensions of each chamber 3 and 4 are determined by Equation 4, while the value $M_1$ determines the dimensions of passage 5 in accordance with Equation 1, 2, or 3 depending on the nature of the passage.

Calculations may be simplified by employing the following equations in place of Equations 7 and 8:

(9) $$\frac{I_1}{I_2} = \frac{\sqrt{1-\left(\frac{f}{fc}\right)^2} + \sqrt{-\left(\frac{f}{fc}\right)^2}}{\sqrt{1-\left(\frac{f}{fc}\right)^2} - \sqrt{-\left(\frac{f}{fc}\right)^2}}$$

(10) $$a + jB = 2\ln\left(\sqrt{1-\left(\frac{f}{fc}\right)^2} + \sqrt{-\left(\frac{f}{fc}\right)^2}\right)$$

where $f$ = the fundamental frequency of the discharge from compressor 2,
$fc$ = the cut-off frequency for which the attenuator should be designed so that when operated at a frequency $f$ it will be given the desired attenuation $I_1/I_2$.

Equations 9 and 10 are developed from Equations 7 and 8 since the quantity $Z_1/4Z_2$ used in Equations 7 and 8 can be shown to be equal to $-(f/fc)^2$.

The attenuator shown in Figure 1 or 2 approaches more nearly theoretical performance when installed in a line having an impedance at zero frequency equal to the characteristic impedance of the attenuator. Expressing the characteristic impedance of the attenuator at zero frequency as $Z_k$, the following equation holds:

(11) $$Z_k = \sqrt{M_1/C_2}$$

The impedance of the line at zero frequency $R_0$ may be found by computing the line resistance to the flow of fluid at a uniform rate equal to the average value of $I_1$ expressed in (lbs.)(sec.)/(ft.)$^5$ units. Thence Equation 11 becomes (12) $$R_0 = \sqrt{M_1/C_2}$$

Combining Equations 5 and 11 it can be shown that (13) $$M_1 = Z_k/\pi fc$$

(14) $$C_2 = \frac{1}{\pi fc Z_k}$$

Hence the previously determined value of cut-off frequency $fc$ required to give the desired attenuation $a$ when operating at a frequency $f$ can be made to yield the required values of inductance and capacitance for either the π- or T-section attenuator of Figure 1 or 2 respectively in which the iterative impedance of the attenuator will equal the line impedance at zero frequency.

A further improvement in the attenuator of Figure 1 or 2 is made by terminating the attenuator with a line which has an impedance at zero frequency equal to the characteristic impedance of the attenuator section. The characteristic impedance for a T-section $Z_{kT}$ can be determined in accordance with the following equation:

(15) $$Z_{kT} = \sqrt{\frac{M_1}{C_2}}\sqrt{1-\left(\frac{f}{fc}\right)^2}$$

and the characteristic impedance for a π-section $Z_{k\pi}$ is given by the following equation:

(16) $$Z_{k\pi} = \frac{\sqrt{M_1/C_2}}{\sqrt{1-\left(\frac{f}{fc}\right)^2}}$$

In Equations 15 and 16 all of the terms have been previously evaluated. Since the ratio of the fundamental frequency to the cut-off frequency is necessarily greater than 1 in order to produce attenuation of the fundamental frequency, the characteristic impedance of both the π- and T-sections will be capacitive and hence the impedance of the line terminating the attenuator can be calculated in accordance with Equation 4.

Figure 3:
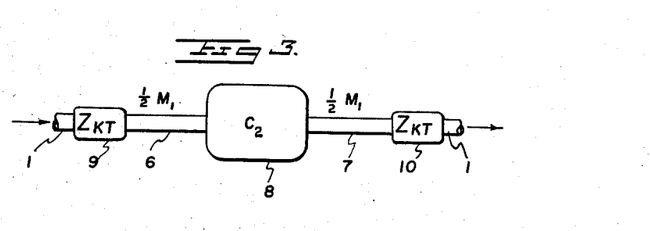
Figure 3 is a diagrammatic representation of a T-section attenuator terminated in its characteristic impedance at both ends.

Figure 3 shows in diagrammatic manner a T-section attenuator of the type shown in Figure 2 which is terminated at both ends in its characteristic impedance. Thus the attenuator of Figure 3 includes not only passages 6 and 7 interconnected by chamber 8 but chambers 9 and 10 connected to the ends of the attenuator.

Figure 4:
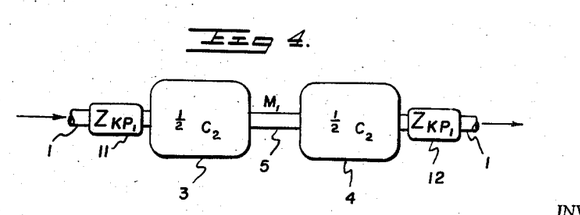
Figure 4 is a diagrammatic representation of a $\pi$-section attenuator terminated in its characteristic impedance at both ends.

Figure 4 similarly shows a $\pi$-section attenuator of the type shown in Figure 1 in which chambers 3 and 4 are interconnected by passage 5 as before. The ends of the attenuator are each terminated by a chamber 11, 12, respectively, which equals the characteristic impedance of the attenuator.

In $\pi$ attenuators such as shown in Figure 1 the operation is frequently improved by adding an impedance ahead of the attenuator, that is between the attenuator and the compressor discharging into the gas line in which the attenuator is employed. Under such circumstances the value of the impedance is a function of the zero frequency impedance of the line $R_0$ previously referred to. In terms of $R_0$ the input impedance should lie between $$M_2 = \frac{R_0}{1000} \text{ and } M_2 = \frac{R_0}{1130}$$

Figure 5:
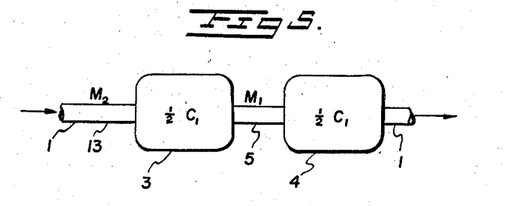
Figure 5 represents an impedance input attenuator used in accordance with this invention.

Figure 5 illustrates a $\pi$-section attenuator including chambers 3 and 4 interconnected in gas line 1 by passage 5. On the input side of the attenuator a second passage 13 is added having an inductance value $M_2$ as defined in the foregoing paragraph. Passage 13 is conveniently forced as the connection between the pump discharge and the attenuator. The dimensions of passage 13 is of course governed by Equation 1, 2, or 3 based on the value $M_2$ previously referred to.

An important aspect of this invention is in the use of multiple section attenuators. Frequently the desired attenuation cannot be attained in a single attenuator section without resorting to inconveniently large chambers and highly restricted passages which have unfavorable resistance to the flow of gas in the pipe line. In such circumstances, two or more sections are arranged in series. The desired overall attenuation $a_T$ for an attenuator of $n$-sections is equal to the product of the attenuation in each individual section, $a_1.a_2 \ldots a_n$. What has been previously said with regard to the design of individual T- and $\pi$-section attenuators of course applies to the design of individual sections which are joined in a multi-unit attenuator.

Figure 6:
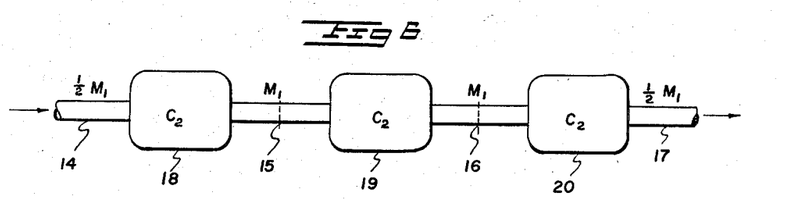
Figure 6 represents a series of T-section attenuators.

Figure 6 illustrates a triple T-section attenuator in which passages 14, 15, 16 and 17 are connected in series in a gas line and interconnect chambers 18, 19 and 20. It will be noted that each passage 15 and 16 has double the inductance of either passage 14 or 17. This is due to joining consecutive T-sections. Actually passage 15 contains the end of the first T-section and the beginning of the second, while passage 16 contains the end of the second T-section and the beginning of a third.

Figure 7:
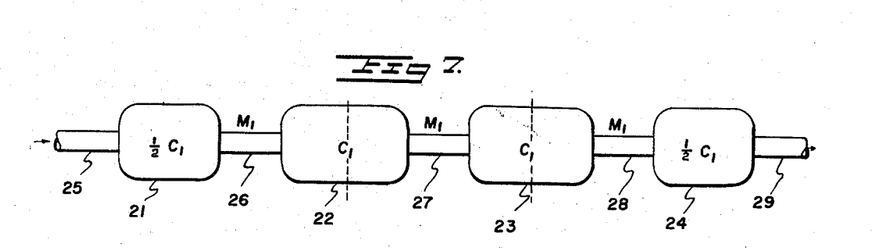
Figure 7 represents a series of $\pi$-section attenuators.

Figure 7 shows a triple $\pi$-section attenuator suitable for connection in a gas line which comprises four chambers 21, 22, 23 and 24 in series in a gas line connected at their ends and interconnected by passages 25, 26, 27, 28 and 29. It will be noted that chambers 22 and 23 have double the capacitance of chambers 21 and 24 due to the junction of succeeding $\pi$-sections in the attenuator.

In connection with such multi-unit attenuators as shown in Figures 6 and 7, I have found it is sometimes desirable particularly for convenience and economy in piping to join a $\pi$-section attenuator to a T-section attenuator rather than form a multi-unit attenuator having identical sections throughout. In this case, however, the $\pi$-section and the T-section should not be joined directly but should be joined by means of a half section attenuator (L-section) made by splitting a $\pi$-section or a T-section attenuator.

Figure 8:
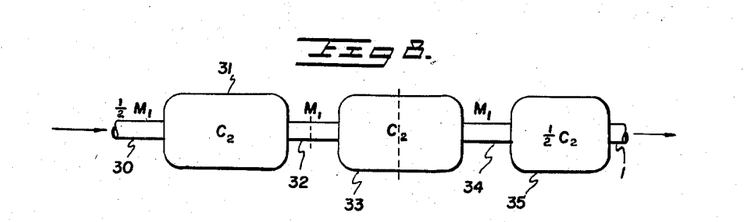
Figure 8 is a diagrammatic representation of a series of attenuators used in accordance with this invention consisting of a T-section and a $\pi$-section joined by an L-section.

Figure 8 illustrates a dual unit attenuator comprising an initial T-section which includes passage 30, chamber 31, and the first half of passage 32. The T-section then leads to an L-section which includes the second half of passage 32 and the first half of chamber 33. The L-section is then connected to a $\pi$-section attenuator which includes the second half of chamber 33, passage 34, and chamber 35.

Figure 9:
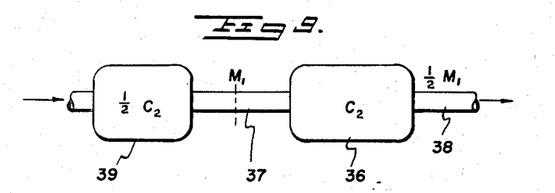
Figure 9 represents a T-section terminated in an L-section.
Figure 10:
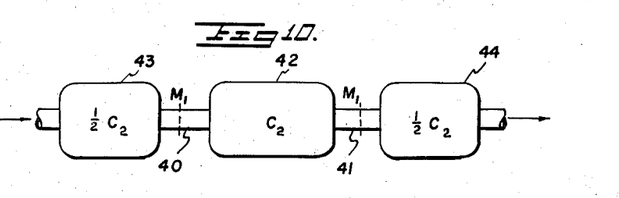
Figure 10 represents a T-section terminated in an L-section at each end.
Figure 11:
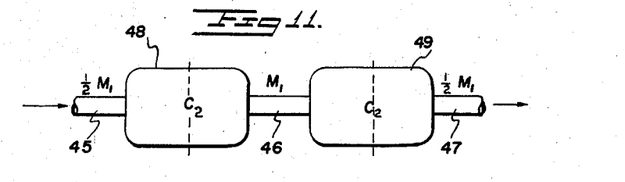
Figure 11 represents a π-section terminated in an L-section at each end.

L-sections have additional uses and are particularly desirable for terminating either or both ends of an attenuator of the single section or multi-unit type. Figures 9, 10 and 11 illustrate various uses of L-sections. It will be noted that an L-section corresponds to a symmetrical half of either a T-section or $\pi$-section. An L-section which terminates a $\pi$-section appears as the adjacent half of another $\pi$-section. Similarly, the L-section which terminates one end of a T-section appears as the adjacent half of the next T-section in a series of T-sections. Referring for a moment to Figure 8, just discussed, it will be seen that the L-section which is used to join a T-section and a $\pi$-section appears to the T-section as the near half of a succeeding T-section and appears to the $\pi$-section as the near half of a preceding $\pi$-section.

Figure 9 shows a standard T-section of the type diagrammatically represented in Figure 2 comprising chamber 36, one half of passage 37, and passage 38. The upstream L-section which terminates the T-section is a chamber 39 and the first half of passage 37. It will be noted that in computing the dimensions of the whole attenuator shown in Figure 9 in accordance with the formulas set forth hereinabove the capacitance of chamber 36 is $C_2$ as before. The inductance of passage 38 is one-half $M_1$ as before. Passage 37, however, includes the inductance of the L-section as well as the inductance required for the T-section. Since each of these is one-half $M_1$ the total inductance for passage 37 is $M_1$. Chamber 39 of the L-section has one-half the capacitance of a standard T-section and hence its inductance is one-half $C_2$.

Figure 10 shows a standard T-section terminated at both ends in an L-section. The attenuator includes a T-section composed of the latter half of passage 40 and the first half of passage 41 interconnected by chamber 42. The upstream L-section includes chamber 43 and the first half of passage 40, while the downstream L-section includes the latter half of passage 41 and chamber 44. In forming such a T-section terminated at both ends with an L-section, chambers 43 and 44 each have a capacitance calculated with the preceding formulas of a value of one-half $C_2$. Chamber 42 has a capacitance of $C_2$ and passages 40 and 41 each have an inductance of $M_1$.

Figure 11 represents a $\pi$-section filter terminated at each end with an L-section. The attenuator includes three passages 45, 46 and 47 and two chambers 48 and 49 in which chamber 48 interconnects passages 45 and 46 and chamber 49 interconnects passages 46 and 47. Passages 45 and 47 each have an inductance of one-half $M_1$. Each of chambers 48 and 49 has a capacitance of $C_2$. Passage 46 has an inductance of $M_1$. It will be seen that the $\pi$-section includes the latter portion of chamber 48, the initial portion of chamber 49, and interconnecting passage 46.

A careful review of the equations previously discussed relating to the ratio of $I_1$ to $I_2$ and relating to the ratio of the fundamental frequency to the cut-off frequency reveals that infinite attenuation can be attained only at a value of the ratio of fundamental frequency to cut-off frequency which is equal to infinity. Since there are circumstances under which it would be desirable to attain theoretical infinite attenuation at a finite value of the ratio of fundamental frequency to cut-off frequency, other types of attenuator sections must be added to the previously described sections to permit infinite attenuation within finite limits.

Either a $\pi$- or T-section attenuator as previously disclosed may be designed having a cut-off frequency $fc$ which is below some finite frequency $f_\infty$ of infinite attenuation. If $f_\infty$ is divided by $fc$ and this ratio is defined as $b$ a value $m$ may be chosen according to the following relationship:

(17) $$m=\sqrt{1-1/b_2}$$

The factor $m$ may be suitably employed in redesigning $\pi$- and T-sections and L-sections by the addition of added elements wherein the values of $M_1$ and $C_2$ are derived including the factor $m$ or a function thereof. In an $m$-derived T-section, for example, the T-section shown in Figure 2 is structurally altered by replacing chamber 8 with an inductive arm between passages 6 and 7. Chamber 8 is then connected on the end of the inductive arm which may be an additional passage, i.e. a tube, orifice, slit or the like. The inductance of each series arm of the $m$-derived T-section is altered to a value of $$\frac{nM_1}{2}$$

The capacitance of the chamber becomes $mC_2$ and the inductance of the additional passage has a value of $$\left(\frac{1-m^2}{4m}\right)M_1$$

Corresponding changes can be designed in a $\pi$-section.

The attenuation of an $m$-derived section at other frequencies is often important. This can be found by Equation 10 wherein $$-\left(\frac{f}{fc}\right)^2$$

is replaced with the value $$\frac{(2\pi f)^2 m^2 M_1 C_2}{(2\pi f)^2(1-m^2)M_1C_2-4}$$

Figure 12:
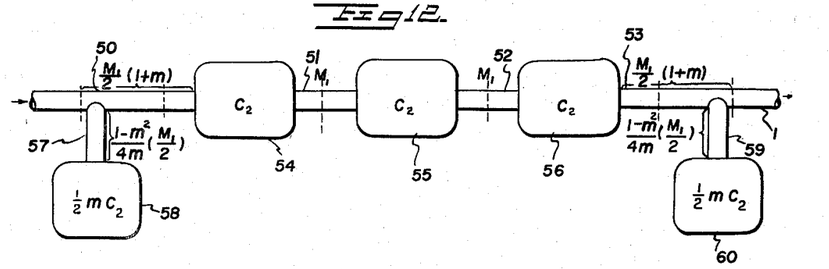
Figure 12 represents a composite attenuator according to this invention composed of three T-section attenuators terminated in an m-derived L-section at each end.

Figure 12 illustrates diagrammatically a composite attenuator composed of three standard T-section attenuators terminated at each end by an $m$-derived L-section. The particular advantages of this arrangement include not only the high degree of attenuation of a multiple section, but extremely sharp attenuation between the cut-off frequency and some other finite frequency $f_\infty$ defined by Equation 17 at which infinite attenuation theoretically occurs. The multiple unit attenuator of Figure 12 includes in series with gas line 1 four restricted passages 50, 51, 52 and 53 interconnected by chambers 54, 55 and 56, respectively. At the point where gas line 1 joins passage 50 side arm passage 57 is attached to passage 50. The end of side arm passage 57 is terminated in chamber 58. At the point where passage 53 re-enters gas line 1 side passage 59 is attached to the attenuator. Side passage 59 terminates at its end with chamber 60. The attenuator as seen from an acoustical point of view includes an initial $m$-derived L-section which includes chamber 58, passage 57 and part of passage 50. The attenuator then includes a series of three standard T-sections and terminates in an $m$-derived L-section which includes part of passage 53, passage 59 and chamber 50. The inductances of passages 51 and 52 are $M_1$. Each of chambers 54, 55 and 56 has a capacitance of $C_2$. Each of chambers 58 and 60 has a capacitance of $$\frac{1}{2}mC_2$$

Each of passages 57 and 59 has an inductance of $$\frac{1-m^2}{4m}\left(\frac{M_1}{2}\right)$$

Each of passages 50 and 53 has an inductance equal to $$(1+m)\frac{M_1}{2}$$

To design a composite attenuator, the center standard T- or $\pi$-section or sections are first designed as previously outlined. In general, it will be found satisfactory to select a cut-off frequency slightly less than the lowest frequency (fundamental) to be suppressed. An $m$-derived section is then designed such that $f_\infty$ will be approximately equal to the fundamental frequency of the periodic current and pressure waves to be attenuated. This $m$-derived section is then split, as described before, and half of it added to each end of the standard section attenuator. If the value of $m$ selected is greater than about 0.8 or less than about 0.4, I have found it desirable to add a full $m$-derived section to the interior of the attenuator in addition to using the $m$-derived L-sections at the ends.

Figure 13:
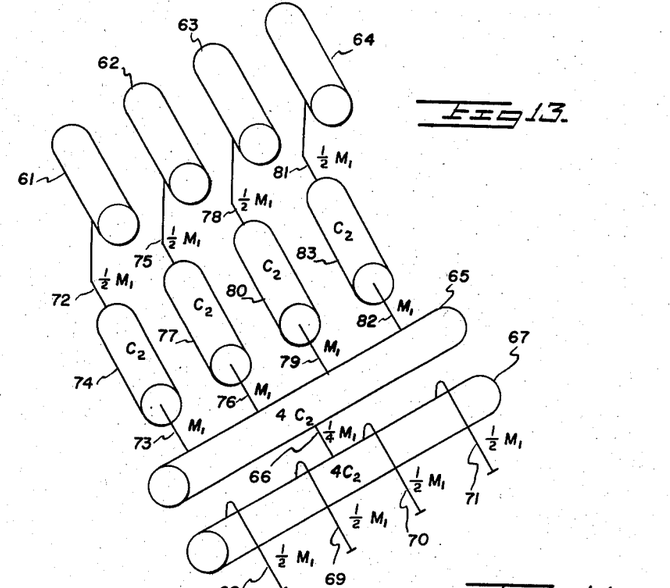
Figure 13 is a diagrammatic representation of the incorporation of the principles of this invention into the design of a multiple connection piping system.

While the attenuator designs described so far have been single or series units designed primarily to serve a single source of pulsative flow, it is frequently possible to adapt portions of the plant piping as the inductances and capacitances required to form an effective attenuator. This is illustrated in Figure 13. The gas from four compressor cylinders 61, 62, 63 and 64 is to be delivered through individual laterals into common header 65. The gas from this header is to be carried through single pipe 66 to second header 67 located near a cooling tower (not shown). Risers 68, 69, 70 and 71 from second header 67 deliver the gas to four cooling sections located in the cooling tower (cooling sections and cooling tower not shown). It is required to deliver the gas to the cooling sections with pulses sufficiently attenuated that the tubes of the cooling sections will not be damaged by vibration.

The piping just described can be adapted to function either as the equivalent of two $\pi$-sections in series, or as the equivalent of three T-sections in series. Since less attenuation per stage is required for the three T-sections, its design is illustrated in Figure 13, although two $\pi$-sections could be designed to be equally effective, as has been previously indicated.

The required overall attenuation is first estimated. No general rule can be given for this as it depends entirely upon the nature of the equipment to be protected against pulsation. A high degree of attenuation is required to protect highly stressed tubes whose mechanical configuration is such that the pulse frequency coincides with, or is close to, the natural frequency of vibration of the tubes. On the other hand, a relatively small attenuation may be sufficient for lightly stressed tubes, whose mechanical configuration is such that the pulse frequency is well above the natural frequency of vibration of the tube. Having determined the required overall attenuation, the attenuation per stage, as previously explained, is equal to the cube root of this for a three-section unit. The required values of $M_1$ and $C_2$ are then found by methods previously described. For a three-section T-attenuator, three chambers are required in series. Headers 65 and 67 can be used as two of these. The third chamber is divided into individual parallel units, each of which is connected in the lateral between one of the compressor cylinders and header 65. Thus the lateral between cylinder 61 and header 65 includes two pipes 72 and 73 interconnected by chamber 74, the lateral between cylinder 62 and header 65 includes pipes 75 and 76 interconnected by chamber 77, the lateral between cylinder 63 and header 65 includes pipes 78 and 79 and chamber 80, and the lateral between cylinder 64 and header 65 includes pipes 81 and 82 and chamber 83. This is a particularly useful arrangement if the length of first header 65 is long as compared to the wave length of the periodic flow of gas, in which case resonance may occur in header 65 from the pressure waves set up. By introducing the third capacitative units 74, 77, 80 and 83 between each cylinder 61, 62, 63 and 64 and header 65, the magnitude of the pressure waves is thus reduced.

The value of the capacitance of each chamber 74, 77, 80 and 83 is equal to $C_2$. It is introduced in each lateral at such a location that the inductance of each pipe 72, 75, 78 and 81 has a value $$\frac{M_1}{2}$$

equal to one of the series arms of a T-section. The inductance of each pipe 73, 76, 79 and 82 must have a value of $M_1$, since it contains two series arms. The capacitance of header 65 must be equal to four times the capacitance of the chambers in the laterals, since one capacitance which is the equivalent of four capacitances in parallel must be equal to the sum of the four individual capacitances.

However, a single inductance, M, which is equivalent to four inductances, $M_1$, in parallel is found as follows:

$$\frac{1}{M} = \frac{1}{M_1} + \frac{1}{M_1} + \frac{1}{M_1} + \frac{1}{M_1} = \frac{4}{M_1} \text{ hence, } M = M_1$$

Therefore, the inductance of pipe 66 connecting headers 65 and 67 must be one-fourth the value of the inductance of each pipe 73, 76, 79 and 82. The capacitance of second header 67 is also equal to $4C_2$. The inductance of each of the four risers 68, 69, 70 and 71 to the cooling sections is again $M_1/2$. If two risers were used, the inductance of each would be found as follows:

$$\frac{1}{M} = \frac{1}{\frac{M_1}{2}} + \frac{1}{\frac{M_1}{2}} = \frac{4}{M_1}$$

M is thus equal to $$\frac{M_1}{4}$$

the inductance of each of two parallel risers. If only one riser were used, its inductance would be found as follows:

$$\frac{1}{M} = \frac{1}{\frac{M_1}{2}} + \frac{1}{\frac{M_1}{2}} + \frac{1}{\frac{M_1}{2}} + \frac{1}{\frac{M_1}{2}} = \frac{8}{M_1} \text{ hence, } M = \frac{M_1}{8}$$

While this discussion has related to the use of the equivalent of three T-sections in series, the same procedure can be used to adapt conventional header system composed of laterals, headers, scrubbers, etc., into attenuator systems equivalent to one or more T-, π-, or m-derived sections in series. While it is desirable that the product $M_1C_2$ should be the same for each of the equivalent series attenuator sections, it is not absolutely essential that this be the case. If the product $M_1C_2$ is not constant, the degree of attenuation will not be the same in all sections.

It was also pointed out that the dimensions of the component parts, inductances and capacitances, should be small with respect to the length of the pressure wave occurring in the gas stream in order that resonance may not occur, or too much interference be suffered by the reflection of these waves. The wave length is found from the following equation:

$$W = \frac{V}{N}$$

W=wave length of pressure wave in feet,
V=velocity of sound in the flowing medium, feet per second corrected for the velocity of the flowing stream,
N=frequency of the pulses (or waves) in cycles per second.

If it is found that the length of a lateral or header cannot be kept short, the disturbance caused by this can be minimized by installing an orifice of about one-half the pipe diameter, spaced about $1/10$ to $1/12$ of a wave length apart.

Figure 14:
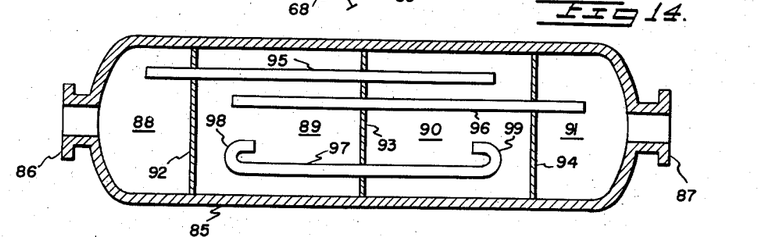
Figure 14 is a sectional view illustrating a structural design embodying the three-stage π-section attenuator shown in Figure 7.

Figure 14 shows a specific structure incorporating a three-stage π-section attenuator of the type diagrammatically represented by Figure 7. The attenuator shown in Figure 14 comprises an elongated cylindrical shell 85 having an inlet fixture 86 at one end and an outlet fixture 87 at the opposite end. Fixtures 86 and 87 are provided with a flange or other suitable means for connection in series in a gas line. Three transverse partitions 92, 93 and 94 divide cylinder 85 into four chambers 88, 89, 90 and 91, respectively. A passage in the form of pipe 95 passes in tight connection through partitions 92 and 93 and interconnects chambers 88 and 90. A second passage in the form of pipe 96 passes in tight connection through partitions 93 and 94 and interconnects chambers 89 and 91. A third passage in the form of a pipe 97 having J-shaped ends 98 and 99 passes in tight connection through partition 93 and interconnects chambers 89 and 90.

Referring for the moment to Figure 7, it will be seen that chamber 88 corresponds to chamber 21 in that figure, chamber 90 corresponds to chamber 22, chamber 89 corresponds to chamber 23, and chamber 91 corresponds to chamber 24. Pipe 95 corresponds to passage 26, pipe 97 corresponds to passage 27, and pipe 96 corresponds to passage 28. Thus chambers 88 and 91 are each designed to have an acoustical capacitance of $\frac{1}{2}C_2$ in accordance with the form outlined above, while chambers 89 and 90 are each designed to have an acoustical capacitance of $C_2$. Each pipe 95, 96 and 97 is designed to have an acoustical inductance of $M_1$.

The structural arrangement of the chambers and passages in Figure 14 is particularly advantageous when rather elongated passages are required in relation to the sizes of the chambers. Thus, instead of structurally placing the chambers in the order in which gas flows through them, employing the reversed position arrangement shown in Figure 14 permits a single cylinder to contain the entire attenuator including not only all the chambers but also all the passages with minimum requirement of specially shaped parts. The J-shaped ends illustrated at 98 and 99 on pipe 97 have no great significance acoustically but are employed in order to obtain the required length of passage interconnecting chambers 89 and 90. Unlike pipes 95 and 96, pipe 97 must be confined in a shorter distance since the chambers it interconnects are structurally adjacent.

Figure 15:
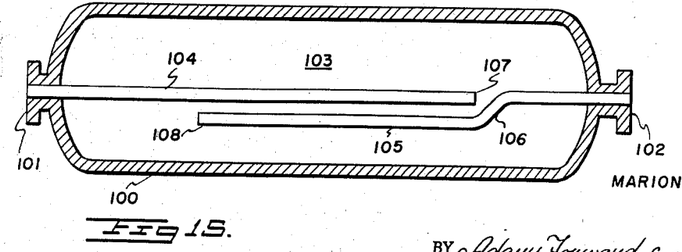
Figure 15 is a sectional view of a structural design for a single stage T-section attenuator according to the principles diagrammatically illustrated in Figure 2.

Figure 15 illustrates a specific structure utilizing a single stage T-section attenuator embodying the principles diagrammatically illustrated in Figure 2. The T-shaped attenuator of Figure 15 includes an elongated cylindrical housing 100 having an inlet fixture 101 and an outlet fixture 102 and defining a chamber 103. The inlet and outlet fixtures 101 and 102, like the corresponding fixtures 86 and 87 of Figure 14, are suitably provided with flanges or other means for securing the attenuator in series in a gas line. The passages forming the legs of the T-section are internally positioned within chamber 103, extending from the inlet and outlet fixtures 101 and 102. Thus, the inlet passage leg is a pipe 104 which at one end is tightly fixed in inlet 101. Pipe 104 extends its full length within the interior of chamber 103, opening therein at its other end 107. The outlet passage leg of the T-section is in the form of elongated pipe 105 fixed tightly at one end in outlet 102 of the attenuator. Pipe 105 extends inwardly into chamber 103 opening therein at its other end 108. Outlet pipe 105 is suitably warped as shown at 106 in order to avoid coinciding with inlet pipe 104. Warp 106 has no significant acoustical effect but its use is imposed by the structural limitations involved in providing sufficiently elongated passages for the attenuator requirements. In some circumstances where the design requirements determine that pipes 104 and 105 need have less than half the length of chamber 103, warp 106 will not be required. In such circumstances care should be taken that the open ends 107 and 108 do not so closely approach each other as to amount to an orifice within the limitations of Equation 3. Such a structure would acoustically represent an m-derived T-section, the cut-off frequency of which would be removed from the desired point rendering the performance of the attenuator less than desirable.

In Figure 15 each pipe 104 and 106 is designed to have an inductance of $\frac{1}{2}M_1$ and chamber 103 to have a capacitance of $C_2$, determined by the attenuation desired and frequencies to be suppressed.

Figure 16:
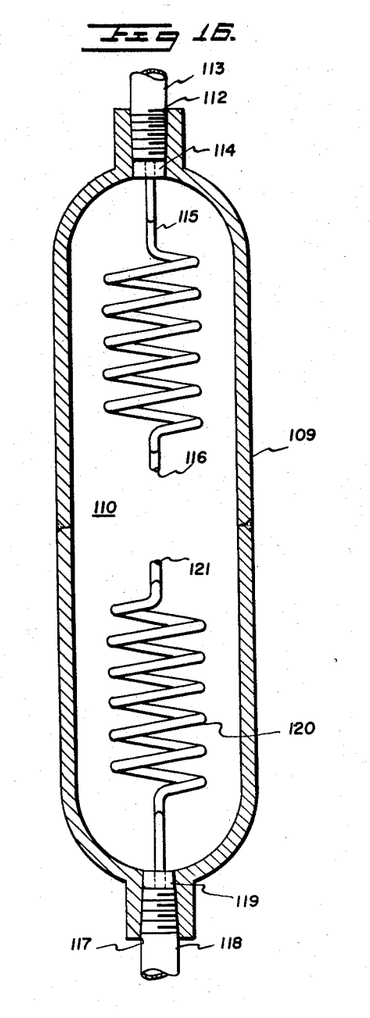
Figure 16 is a sectional view of a structure incorporating a T-section attenuator according to the principles illustrated in Figure 2 which is particularly suitable for use as a pulsation dampener for pressure gauges.

Figure 16 illustrates a T-section attenuator similar to that shown in Figure 15. The attenuator shown in Figure 16 is designed for high pressure service and includes a cylindrical shell 109 defining a chamber 110. Cylinder 109 is suitably made of forged steel or other high pressure materials. A tapped opening 112 is provided at one end to receive the threaded end of an inlet gas pipe 113. Plug 114 is welded within opening 112 to provide pressure tight connection for the end of helically wound pipe 115 which extends into chamber 110 terminating therein at its open end 116. The opposite end of cylinder 109 is similarly tapped at 117 to receive outlet gas pipe 118, plug 119 and pipe 120 which correspond to the described arrangement of parts at the inlet end of cylinder 109. Pipes 115 and 120 form the inlet and outlet legs respectively of the T-section. Since the device is designed for high pressure service the volume of chamber 110 defined by cylinder 109 is necessarily low. Thus, in order to meet the structural limitations imposed by Equation 6 and Equations 1 and 4, the lengths of pipes 115 and 120 are necessarily long in relation to the length of the chamber 110. The helically wound pipes 115 and 120 are highly suitable for such purposes since the helical form permits compressing each pipe into a relatively short space occupying a relatively small volume. At the same time open ends 116 and 121 of pipes 115 and 120 respectively can be sufficiently separated to prevent the difficulties of forming an orifice betwen them noted above with respect to the open ends 107 and 108 of the attenuator shown in Figure 15.

As in the corresponding parts of Figure 15, the acoustical inductance of each pipe 115 and 120 has a value of ½$M_1$ and the acoustical capacitance of chamber 110 defined by cylinder 109 has a value $C_2$. The attenuator shown in Figure 16 as pointed out previously is particularly suitable for high pressure service. Generally, the use of such an attenuator is extremely advantageous in the line leading to a pressure gauge in order to prevent undue fluctuation and serious vibration of the delicate parts of the gauge at the high pressures employed.

Figure 17:
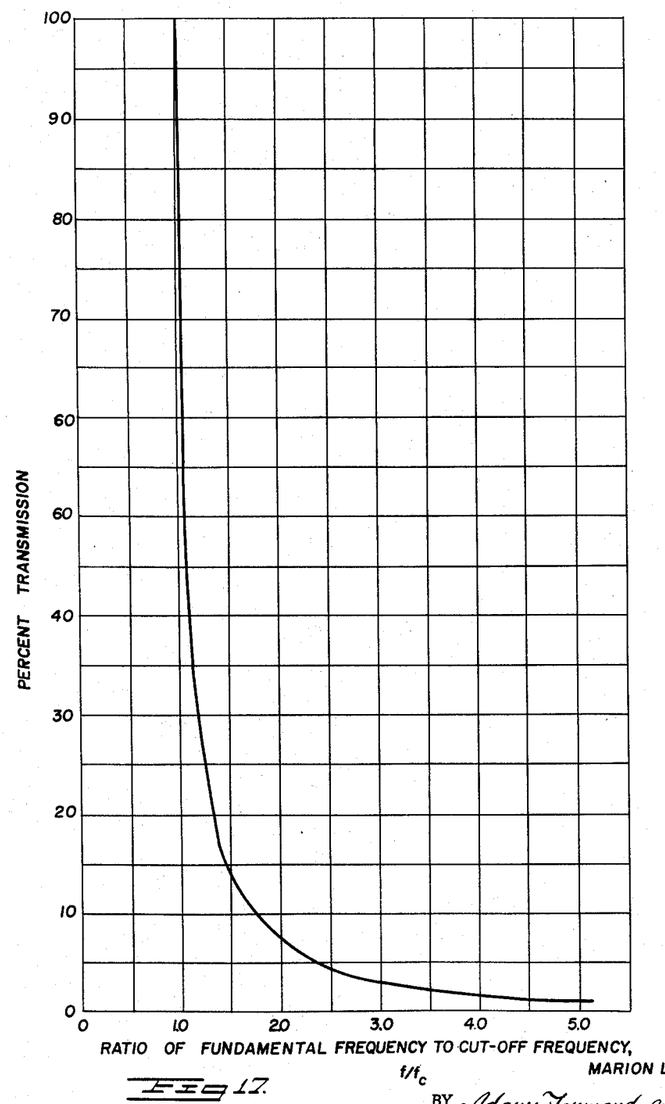
Figure 17 is a plot illustrating the theoretical performance of a single section of a low pass acoustical filter according to this invention showing percent transmission against the ratio of fundamental frequency to cut-off frequency.

Figure 17 is a plot showing percent transmission in a single π- or T-section attenuator compared with the ratio of fundamental frequency $f$ to cut-off frequency $fc$. It will be noted that when the cut-off frequency is designed to equal fundamental frequency (a ratio of 1), 100% transmission of the fundamental frequency is obtained. In the design of volume current attenuators heretofore it has erroneously been assumed that the cut-off frequency of a low-pass filter is the frequency at which 100% attenuation is achieved. Figure 17 clearly shows the extent of such error.

Generally, in the design of a filter in accordance with the principles outlined above, the desired attenuation (or correspondingly the desired transmission) is first selected. From Figure 17 the requisite ratio of fundamental to cut-off frequency to obtain such transmission can be immediately determined. The equations for calculation of $M_1$ and $C_2$ based on cut-off frequency can then be applied to determine the characteristics and dimensions of the components of the filters.

It will be seen that Figure 17 also indicates the transmission of harmonics since each harmonic of the fundamental frequency can also be expressed as a ratio of the harmonic to the cut-off frequency. Thus, if a fundamental frequency X is to be suppressed at a ratio of fundamental frequency to cut-off frequency of 2.0, the percent transmission of the fundamental frequency in a single-stage attenuator designed according to the principles outlined above, can be determined by the plot shown in Figure 17 to be approximately 7.5%. The first harmonic of frequency X will be of frequency 2X. Its ratio to the cut-off frequency therefore will be obviously 4.0 and percent transmission of the first harmonic as shown in the plot of Figure 17 will be approximately 1.5%.

The plot in Figure 18 illustrates the theoretical relationship between attenuation in a single-stage attenuator and ratio of fundamental frequency to cut-off frequency. Such a plot illustrates one of the singular advantages of multi-section attenuators. For example, assume a three-section attenuator is to be designed giving an overall fundamental frequency attenuation equivalent to a ratio of $I_1/I_2$ of 27. As noted above, the attenuation of a given frequency in a multi-stage attenuator is equal to the product of the attenuations of the frequency in each stage of the attenuator. Thus to obtain an attenuation of 27 for the fundamental frequency in a three-stage attenuator, each stage must have an attenuation, expressed as $I_1/I_2$ of 3. Figure 18 shows that each stage of such an attenuator must therefore be designed with a ratio of fundamental frequency to cut-off frequency of approximately 1.15 as opposed to the ratio for an equivalent single-stage attenuator which would be approximately 2.7.

Regarding the suppression of harmonics, which often are more destructive and undesirable than the fundamental frequency, a single-stage attenuator having a fundamental frequency attenuation of 27 will be seen to suppress the first harmonic, according to Figure 18, with an attenuation of approximately 112. On the other hand, in the three-stage attenuator having an overall fundamental frequency attenuation of 27, the attenuation of the first harmonic in each stage will be a value of $I_1/I_2$ of approximately 18.5. The attenuation of the three-stage filter thus is 18.5 cubed, or approximately 6165.

This application is a continuation-in-part of application, Serial No. 371,689, filed July 31, 1953, now abandoned

I claim:

1. A volume-current attenuating device for attenuating periodical pressure and current waves of a gas flowing therethrough which comprises a pair of serially interconnected identical attenuator halves, each half comprising a chamber possessing acoustical capacitance and a passage possessing acoustical inductance, wherein said chamber and said said passage of each said half of said attenuator are serially interconnected and wherein the dimensions of the chamber and passage of each half of said attenuator are selected with reference to the other properties of the gas to be flowed therethrough such that the total capacitance is one-half $C_2$ and the total inductance is one-half $M_1$ as defined by the equation $$f_c = \frac{1}{\pi\sqrt{M_1 C_2}}$$

in which $f_c$ is a frequency lower than the frequency of said periodical pressure and current waves which is to be attenuated, and in which said halves are interconnected in symmetrical relationship.

2. A volume-current attenuating device according to claim 1 in which said halves are interconnected by connecting said passages whereby said device comprises a pair of chambers possessing acoustical capacitance interconnected by a passage possessing acoustical inductance.

3. A volume-current attenuating device according to claim 1 in which said halves are interconnected by connecting said chambers whereby said device comprises a pair of passages possessing acoustical inductance interconnected by a chamber possessing acoustical capacitance.

4. A volume-current attenuator device according to claim 1 in which the acoustical capacitance, C, of the chambers is defined with reference to the dimensions of the chambers and the physical properties of the gas flowing therethrough by the equation $$C = \frac{V}{nP}$$

in which V is the volume of the chambers in cubic feet, in which $n$ is the exponent of adiabatic or polytropic compression of the gas at average temperature and pressure, and in which P is the average pressure of the gas in pounds per square foot absolute, and in which the acoustical inductance of the passage, M, is defined with reference to the dimensions of the passage and the physical properties of the gas flowing therethrough by the equation $$M = \frac{m}{A^2}$$

in which $m$ is the mass of the gas in the passage in pounds, and in which A is the cross-sectional area of the passage in square feet.

5. A volume-current attenuator device according to claim 1 in which the acoustical capacitance, C, of the chambers is defined with reference to the dimensions of the chambers and the physical properties of the gas flowing therethrough by the equation $$C = \frac{V}{nP}$$

in which V is the volume of the chambers in cubic feet, in which $n$ is the exponent of adiabatic or polytropic compression of the gas at average temperature and pressure, and in which P is the average pressure of the gas in pounds per square foot absolute, and in which the passage is a slit, the acoustical inductance, M, of which is defined with reference to the dimensions of the slit and the physical properties of the gas flowing therethrough by the equation $$M = \frac{6dw}{5A}$$

in which $w$ is the length of the slit in the direction of gas flow in feet, in which $d$ is the density of the gas in slugs per cubic foot at the average pressure and temperature of the gas, and in which A is the cross-sectional area of the slit in square feet.

6. A volume-current attenuator device according to claim 1 in which the acoustical capacitance, C, of the chambers is defined with reference to the dimensions of the chambers and the physical properties of the gas flowing therethrough by the equation $$C = \frac{V}{nP}$$

in which V is the volume of the chambers in cubic feet, in which $n$ is the exponent of adiabatic or polytropic compression of the gas at average temperature and pressure, and in which P is the average pressure of the gas in pounds per square foot absolute, and in which the passage is an orifice the acoustical inductance, M, of which is defined with reference to the dimensions of the orifice and the physical properties of the gas flowing therethrough by the equation $$M = \frac{6dw}{5A}$$

in which $w$ is the length of the orifice in the direction of gas flow in feet, in which $d$ is the density of the gas in slugs per cubic foot at the average pressure and temperature of the gas, and in which A is the cross-sectional area of the orifice in square feet.

7. A volume-current attenuator device according to claim 1 in which the acoustical capacitance, C, of the chambers is defined with reference to the dimensions of the chambers and the physical properties of the gas flowing therethrough by the equation $$C = \frac{V}{nP}$$

in which V is the volume of the chambers in cubic feet, in which $n$ is the exponent of adiabatic or polytropic compression of the gas at average temperature and pressure, and in which P is the average pressure of the gas in pounds per square foot absolute, and in which the passage is a tube of circular cross-section, the inductance, M, of which is defined with reference to the dimensions of the tube and the physical properties of the gas flowing therethrough by the equation $$M = \frac{dl}{A}$$

in which $d$ is the density of the gas in slugs per cubic foot at the average temperature and pressure, in which $l$ is the length of the tube in feet, and in which A is the cross-sectional area of the tube in square feet.

8. A volume-current attenuator section terminated at one end in a half-section for attenuating periodic pressure and current waves of gas flowing therethrough which comprises a chamber possessing acoustical capacitance and a passage possessing acoustical inductance, and wherein the dimensions of the chamber and passage are selected with reference to the physical properties of the gas to be flowed therethrough such that the total capacitance of the half-section is $\tfrac{1}{2}C_2$ and the total inductance of the half-section is $\tfrac{1}{2}M_1$ as defined by the equation $$f_c = \frac{1}{\pi\sqrt{M_1 C_2}}$$

in which $f_c$ is a frequency lower than the frequency of said periodic pressure and current waves which is to be attenuated.

9. A volume-current attenuator device for attenuating periodic pressure and current waves of a gas flowing therethrough which comprises three chambers and three passages, the first passage being connected to the first chamber, the second passage interconnecting the first and second chambers, and the third passage interconnecting the second and third chambers, said chambers and passages possessing acoustical capacitance and inductance respectively, wherein the dimensions of the chambers and passages are selected with reference to the physical properties of the gas flowing therethrough such that the inductance of the first passage is $\tfrac{1}{2}M_1$, the inductance of the second passage is $M_1$, the inductance of the third passage is $M_1$, the capacitance of the first chamber is $C_2$, the capacitance of the second chamber is $C_2$, and the capacitance of the third chamber is $\tfrac{1}{2}C_2$, as defined by the equation $$f_c = \frac{1}{\pi\sqrt{M_1 C_2}}$$

in which $f_c$ is a frequency lower than the frequency of said periodic pressure and current waves which is to be attenuated.

10. A volume-current attenuator device for connection to a pipe line to attenuate periodic pressure and current waves of gas flowing therethrough which comprises a volume-current attenuator section terminated at one end with a passage interconnecting said volume-current attenuator section and the pipe line, a second passage connected to said first passage at the junction thereof with the pipe line, and a chamber connected to the other end of said second passage, the dimensions of the passages and chamber of said terminating section being defined with reference to the physical properties of the gas flowing through the attenuator such that the inductance of the first passage is $$\frac{mM_1}{2}$$

the inductance of the second passage is $$\frac{1-m^2}{4m}\left(\frac{M_1}{2}\right)$$

and the capacitance of the chamber is $\tfrac{1}{2}mC_2$ as defined by the equation $$f_c = \frac{1}{\pi\sqrt{M_1 C_2}}$$

in which $f_c$ is a frequency lower than the frequency of said periodic pressure and current waves which is to be attenuated.

11. A volume-current attenuator device terminated at each end with a passage to which are connected a second passage and a chamber in accordance with claim 10.

12. A volume-current attenuator device for attenuating periodic pressure and current waves of a gas flowing therethrough which comprises an elongated cylindrical shell having an inlet fixture at one end and an outlet fixture at the opposite end, a first, second and third transverse partitions disposed within said shell in order along the length thereof, thereby subdividing the interior of said shell in order into a first, second, third and fourth successive chambers, a pipe passing through the first and second of said transverse partitions intercommunicating the first and third chambers, a second pipe passing through the second and third of said transverse partitions intercommunicating the second and fourth of said chambers, and a third pipe passing through the second of said transverse partitions intercommunicating the second and third of said chambers, each of said pipes possessing an acoustical inductance $M_1$, said first and fourth chambers each possessing an acoustical capacitance of $\frac{1}{2}C_2$ and said second and third chambers each possessing an acoustical capacitance of $C_2$, each with reference to the physical dimensions of the chambers and the physical properties of the gas flowing therethrough as defined in the equation $$f_c = \frac{1}{\pi\sqrt{M_1 C_2}}$$

in which $f_c$ is a frequency lower than the frequency of said periodic pressure and current waves which is to be attenuated.

13. A volume-current attenuator device for attenuating periodic pressure and current waves of a gas flowing therethrough which comprises an elongated cylindrical shell having an inlet fixture at one end and an outlet fixture at the opposite end, and said shell defining a chamber possessing acoustical capacitance, a pipe possessing acoustical inductance connected at one end to said inlet fixture and in open communication at its other end with the interior of said chamber, a second pipe possessing acoustical inductance connected at one end with said outlet fixture and in open communication at its other end with the interior of said chamber, wherein the dimensions of the chamber and of the pipes are selected with reference to the physical properties of the gas flowing therethrough such that the total capacitance of the device, $C_2$, and the total inductance of the device, $M_1$, are defined by the equation $$f_c = \frac{1}{\pi\sqrt{M_1 C_2}}$$

in which $f_c$ is a frequency lower than the frequency of said periodic pressure and current waves which is to be attenuated.

14. A volume-current attenuator device according to claim 13 in which each pipe is formed in a helix.

15. A volume-current attenuator device according to claim 13 in which each of the two pipes is longer than one-half of the length of the cylindrical shell but less than the total length thereof, and in which one pipe has a warp offsetting its position from that of the other pipe.

16. A volume-current attenuator for attenuating periodic pressure and current waves in a flowing stream of gas which comprises a volume current attenuator terminated at one end by elongated zone having an impedance at zero frequency equal to the impedance $Z_k$ of the volume current attenuator defined by the equation $$Z_k = \sqrt{M_1/C_2}$$

in which $M_1$ is the total inductance of the volume current attenuator and $C_2$ is the total capacitance of the attenuator.

17. A volume-current attenuator according to claim 16 in which the volume current attenuator comprises serially a first chamber possessing acoustical capacitance, a passage possessing acoustical inductance and a second chamber possessing acoustical capacitance, wherein the impedance of the attenuator $Z_{k\pi}$ is defined by the equation $$Z_{k\pi} = \sqrt{\frac{M_1/C_2}{1-\left(\frac{f}{fc}\right)^2}}$$

in which $$\frac{f}{fc}$$

represents the ratio of the fundamental frequency, $f$, of said periodic pressure and current waves which is to be attenuated to a lower frequency $fc$.

18. A volume-current attenuator according to claim 16 in which the volume current attenuator comprises serially a first passage possessing acoustical inductance, a chamber possessing acoustical capacitance and a second passage possessing acoustical inductance, wherein the impedance of the attenuator $Z_{kT}$ is defined by the equation $$Z_{kT} = \sqrt{\frac{M_1}{C_2}\left(1-\left(\frac{f}{fc}\right)^2\right)}$$

in which $$\frac{f}{fc}$$

represents the ratio of the fundamental frequency, $f$, of said periodic pressure and current waves which is to be attenuated to a lower frequency $fc$.

19. A volume-current attenuator for attenuating periodic pressure and current waves in a flowing stream of gas which comprises at least one chamber possessing acoustical capacitance and at least one passage possessing acoustical inductance, wherein said chamber and said passage are serially interconnected and wherein the total capacitance, $C_2$, of said attenuator and the total inductance, $M_1$, of said attenuator are related to the desired attenuation, $a$, defined by the equation $$a = 1/2 \ln\left(\frac{I_1}{I_2}\right)^2$$

in which $I_1$ is the input periodic current wave and $I_2$ is the output periodic current wave, by the equation $$\frac{I_1}{I_2} = \frac{\sqrt{1+\frac{Z_1}{4Z_2}}+\sqrt{\frac{Z_1}{4Z_2}}}{\sqrt{1+\frac{Z_1}{4Z_2}}-\sqrt{\frac{Z_1}{4Z_2}}}$$

in which $Z_1 = R_1 + j2\pi f M_1$ and in which $$Z_2 = R_2 - j\frac{1}{2\pi f C_2}$$

in which $f$ is the frequency of said periodic pressure and current waves which is to be suppressed in cycles per second, $j$ is an operator producing a counterclockwise rotation of 90°, and $R_1$ and $R_2$ are the resistances of the passage and chamber and capacitance zone, respectively, expressed in (lb.) (sec.)/(ft.)⁵ units.

20. A volume-current attenuator for attenuating periodic pressure and current waves in a flowing stream of gas which comprises at least one chamber possessing acoustical capacitance and at least one passage possessing acoustical inductance, wherein said chamber and said passage are serially interconnected and wherein the total capacitance, $C_2$, of said attenuator and the total inductance, $M_1$, of said attenuator are related to the desired attenuation, $a$, defined by the equation $$a = 1/2 \ln \left(\frac{I_1}{I_2}\right)^2$$

in which $I_1$ is the input periodic current wave and $I_2$ is the output periodic current wave by the equation $$\frac{I_1}{I_2} = \frac{\sqrt{1-\left(\frac{f}{fc}\right)^2} + \sqrt{-\left(\frac{f}{fc}\right)^2}}{\sqrt{1-\left(\frac{f}{fc}\right)^2} - \sqrt{-\left(\frac{f}{fc}\right)^2}}$$

in which $$\frac{f}{fc}$$

is the ratio of the fundamental frequency, $f$, of said periodic pressure and current waves to be attenuated to a lower frequency, $fc$.

21. A volume-current attenuator for attenuating periodic pressure and current waves in a flowing stream of gas which comprises at least one chamber possessing acoustical capacitance and at least one passage possessing acoustical inductance, wherein said chamber and said passage are serially interconnected and wherein the total capacitance, $C_2$, of said attenuator and the total inductance, $M_1$, of said attenuator are related to the desired attenuation, $a$, defined by the equation $$a = 1/2 \ln \left(\frac{I_1}{I_2}\right)^2$$

in which $I_1$ is the input periodic current wave and $I_2$ is the output periodic current wave, by the equation $$a + jB = 2 \ln \left(\sqrt{1 + \frac{Z_1}{4Z_2}} + \sqrt{\frac{Z_1}{4Z_2}}\right)$$

in which $Z_1 = R_1 + j2\pi f m_1$ and in which $$Z_2 = R_2 - j\frac{1}{2\pi f C_2}$$

in which $f$ is the frequency of said periodic pressure and current waves which is to be suppressed in cycles per second, $j$ is an operator producing a counterclockwise rotation of 90°, $R_1$ and $R_2$ are the resistances of the passage and chamber, respectively, expressed in (lb.)(sec.)/(ft.)[5] units, and in which B is the phase angle between the flow rate and pressure of the periodically varying wave.

22. A volume-current attenuator for attenuating periodic pressure and current waves in a flowing stream of gas which comprises at least one chamber possessing acoustical capacitance and at least one passage possessing acoustical inductance, wherein said chamber and said passage are serially interconnected and wherein the total capacitance, $C_2$, of said attenuator and the total inductance, $M_1$, of said attenuator are related to the desired attenuation, $a$, defined by the equation $$a = 1/2 \ln \left(\frac{I_1}{I_2}\right)^2$$

in which $I_1$ is the input periodic current wave and $I_2$ is the output periodic current wave, by the equation $$a + jB = 2 \ln \left(\sqrt{1 - \left(\frac{f}{fc}\right)^2} + \sqrt{-\left(\frac{f}{fc}\right)^2}\right)$$

in which $$\frac{f}{fc}$$

is the ratio of the fundamental frequency, $f$, of said periodic pressure and current waves to be attenuated to a lower frequency, $fc$, in which $j$ is an operator producing a counterclockwise rotation of 90°, and in which B is the phase angle between the flow rate and pressure of the periodically varying wave.

References Cited in the file of this patent

UNITED STATES PATENTS

| | | |
|---|---|---|
| 2,075,265 | Bourne | Mar. 30, 1937 |
| 2,184,891 | Bourne | Dec. 26, 1939 |
| 2,205,899 | Chipley | June 25, 1940 |
| 2,437,446 | Stephens | Mar. 9, 1948 |
| 2,501,751 | Aldridge | Mar. 28, 1950 |
| 2,518,832 | Stephens | Aug. 15, 1950 |
| 2,631,614 | Stephens | Mar. 17, 1953 |
| 2,661,073 | Deremer | Dec. 1, 1953 |
| 2,795,374 | Isakoff | June 11, 1957 |

UNITED STATES PATENT OFFICE
CERTIFICATE OF CORRECTION

Patent No. 2,943,641                                    July 5, 1960

Marion L. Arnold

It is hereby certified that error appears in the printed specification of the above numbered patent requiring correction and that the said Letters Patent should read as corrected below.

Column 5, line 48, after "90°", the equation should appear as shown below instead of as in the patent:

$$(\sqrt{-1})$$

column 7, line 28, for "forced" read -- formed --; column 11, line 12, after "hence,", the equation should appear as shown below instead of as in the patent:

$$M = \frac{M_1}{4}$$

column 18, line 67, strike out "and capacitance zone".

Signed and sealed this 18th day of April 1961.

(SEAL)
Attest:
ERNEST W. SWIDER
Attesting Officer

DAVID L. LADD
Commissioner of Patents